(12) United States Patent
Waxman

(10) Patent No.: US 7,809,013 B2
(45) Date of Patent: Oct. 5, 2010

(54) CHANNEL SCANNING

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1478 days.

(21) Appl. No.: 11/090,747

(22) Filed: Mar. 24, 2005

(65) Prior Publication Data

US 2006/0215627 A1 Sep. 28, 2006

(51) Int. Cl.
*H04J 3/00* (2006.01)

(52) U.S. Cl. .................. 370/464; 370/311; 370/338; 370/445; 455/161.1; 455/434

(58) Field of Classification Search .......... 370/464, 370/445, 338, 238, 311; 455/161.1, 434
See application file for complete search history.

(56) References Cited

U.S. PATENT DOCUMENTS

| | | | | |
|---|---|---|---|---|
| 5,818,883 A * | 10/1998 | Smith et al. | ............... | 375/347 |
| 5,875,186 A * | 2/1999 | Belanger et al. | ............ | 370/331 |
| 5,978,383 A * | 11/1999 | Molle | ............... | 370/445 |
| 6,332,077 B1 * | 12/2001 | Wu et al. | ............... | 455/432.1 |
| 6,466,608 B1 * | 10/2002 | Hong et al. | ............ | 375/137 |
| 6,816,715 B1 * | 11/2004 | Mano | ............... | 455/161.3 |
| 7,039,417 B2 * | 5/2006 | Lyle et al. | ............... | 455/452.2 |
| 7,299,042 B2 * | 11/2007 | Moore et al. | ............... | 455/434 |
| 2004/0017794 A1 * | 1/2004 | Trachewsky | ............ | 370/338 |
| 2006/0056378 A1 * | 3/2006 | Sugaya | ............... | 370/347 |
| 2006/0068820 A1 * | 3/2006 | Sugaya et al. | ............ | 455/512 |
| 2006/0089138 A1 * | 4/2006 | Smith et al. | ............ | 455/426.1 |
| 2006/0121929 A1 * | 6/2006 | Cave et al. | ............... | 455/522 |
| 2008/0051099 A1 * | 2/2008 | Moore et al. | ............... | 455/454 |

OTHER PUBLICATIONS

Gast, Matthew, 802.11 Wireless Networks: The Definitive Guide, Apr. 2002, O'Reilly, sec. 7.2.*
ANSI/IEEE Std 802.11, 1999 Edition (R2003), "Part 11: Wireless LAN Medium Access Control (MAC) and Physical Layer (PHY) Specifications", pp. 101-104, 125-128.*

* cited by examiner

*Primary Examiner*—Ricky Ngo
*Assistant Examiner*—Luat Phung
(74) *Attorney, Agent, or Firm*—Schwabe, Williamson & Wyatt, P.C.

(57) ABSTRACT

A method of operation in a communications node is disclosed. The method of operation includes the communications node scanning a plurality of channels simultaneously during a period of time, with the communications node selecting for signal processing a first signal, in a first channel in the plurality of channels, in a first sub-period of time in the period of time. The method of operation includes the communications node selecting for signal processing a second signal, in a second channel in the plurality of channels, in a second sub-period of time in the period of time. Embodiments of the present invention include but are not limited to communications nodes and devices, subsystems, and systems equipped to operate in the above described manner.

23 Claims, 5 Drawing Sheets

CHANNEL SCANNING

FIELD

Disclosed embodiments of the present invention relate generally to the field of communications, and more particularly to channel scanning.

BACKGROUND

A network may use multiple channels for communication. Some communications nodes within such a network may operate on a subset of the multiple channels used in the network. Multiple networks may share a common communications medium, and the multiple networks may at least partially operate on different channels. Some communications networks may include both fixed and mobile nodes.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Embodiments of the present invention include but are not limited to a method of operation in a communications node. The method of operation includes the communications node scanning a plurality of channels simultaneously during a period of time, with the communications node selecting for signal processing a first signal, in a first channel in the plurality of channels, in a first sub-period of time in the period of time. The method of operation includes the communications node selecting for signal processing a second signal, in a second channel in the plurality of channels, in a second sub-period of time in the period of time. Embodiments of the present invention include but are not limited to communications nodes and devices, subsystems, and systems equipped to operate in the above-described manner. The following discussion is primarily presented in the context of networks that are at least partially wireless. It is understood that the principles described herein may apply to other networks.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 1:
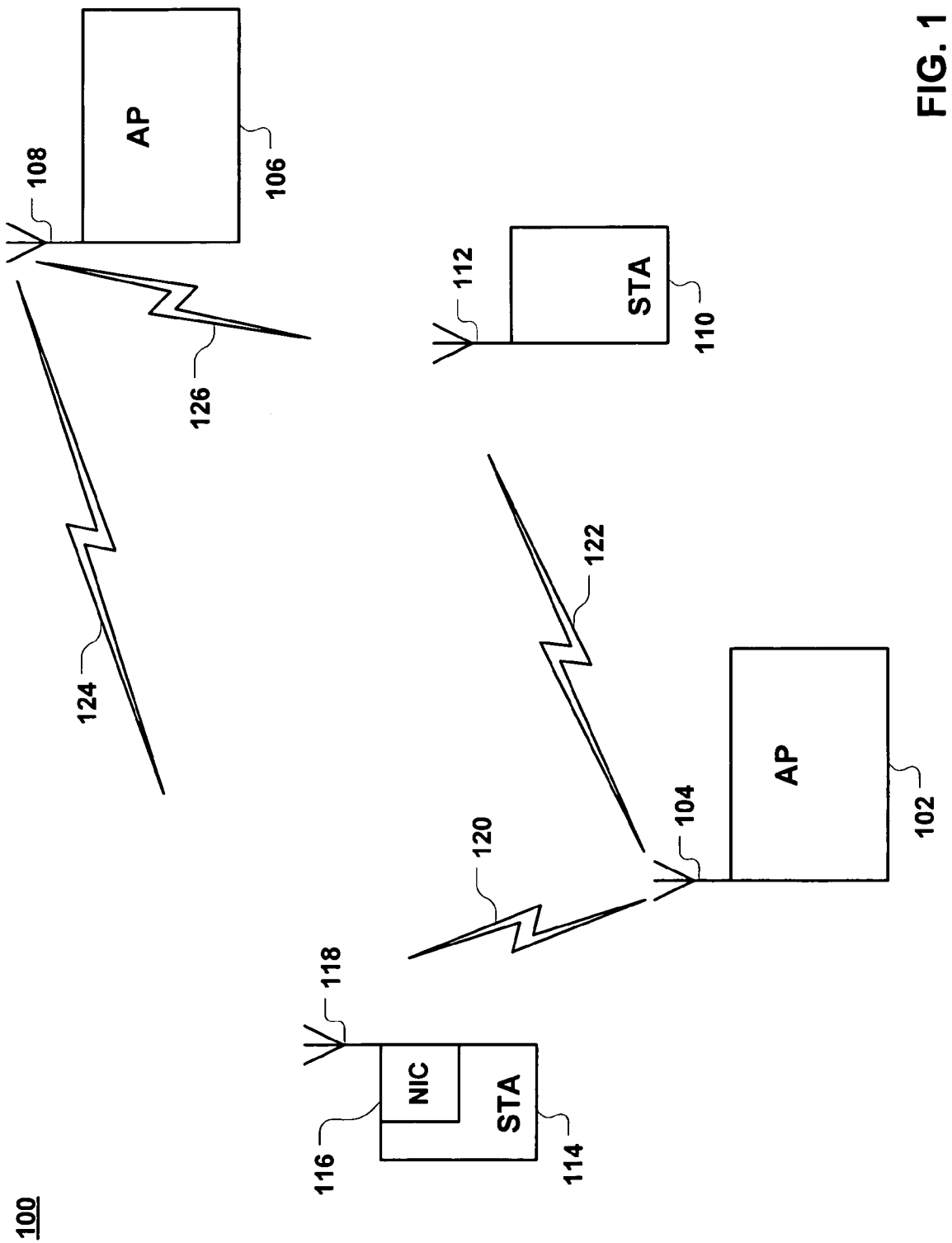
FIG. 1 is a block diagram illustrating some of the functional blocks of a wireless network, in accordance with an embodiment of this invention.

FIG. 1 is a block diagram illustrating some of the functional blocks of a wireless network 100, in accordance with an embodiment of this invention. As illustrated, part of a wireless network may comprise access points (AP) 102 and 106, and stations (STA) 110 and 114. An AP may serve as a point of network access for a STA. In some embodiments, APs 102 and 106, and STAs 110 and 114 may include antennas 104, 108, 112, and 118, respectively. In alternative embodiments, other means for relaying signals between an AP and a STA may be used, for example, infrared transmitters and detectors.

In various applications, one or more STAs 110 and 114 may comprise a network interface card (NIC), a cellular phone, a personal digital assistant (PDA), a handheld computer, a laptop computer, a personal computer, a set-top box, a handheld gaming device, a game console, a video display, a video camera, or any such device that may make use of network access.

At least one of STAs 110 and 114 may be mobile. Switching from one AP to another AP may be performed in accordance with the protocol being used to form the connection between an AP and a STA. In some embodiments, for example, if STA 114 were moved to a position of closer proximity to AP 106 than to AP 102, with such a new position allowing for a higher throughput transmission between STA 114 and AP 106 than between STA 114 and AP 102, STA 114 may terminate a connection with AP 102 and form a connection with AP 106. In various other embodiments, different factors and methods may be involved in switching between network nodes.

In some embodiments, the network accessed by a STA may be a local area network (LAN) with an AP being connected to such a network via a fixed line or some other means, including a wireless link (not shown). In other embodiments, other types of networks may be involved. In various embodiments, the communications nodes operating to connect a STA to a network may at least partially include basestations. In other embodiments, other types of communication nodes may be utilized. In various embodiments, at least one of APs 102 and 106, and at least one of STAs 110 or 114, may be compliant or compatible with the Institute of Electrical and Electronics Engineers (IEEE) 802.11 standard, IEEE std. 802.11-1999, reaffirmed Jun. 12, 2003, forming an 802.11 network. The term, 802.11, will be used herein to refer to all IEEE 802.11 standards, including past, present, and future versions. In various embodiments, AP1 102, AP2 106, and at least one of STAs 110 or 114 may be compliant or compatible with the Institute of Electrical and Electronics Engineers (IEEE) 802.16 standard, IEEE std. 802.16-2001, published Apr. 8, 2002, forming an 802.16 network. The term, 802.16, will be used herein to refer to all IEEE 802.16 standards, including past, present, and future versions. In various embodiments, the applicable network may support both 802.11 and 802.16 standards. In various embodiments, the applicable network may additionally or alternatively comply with other communication standards.

While the embodiment in FIG. 1 shows two APs, other embodiments may include a different number of APs. In various embodiments, an AP may serve as a hub in a hub-and-spoke configuration. In various other embodiments, multiple APs may form a mesh network in a mesh configuration. A STA may include a NIC that provides the STA with the functionality to access a wireless network, as illustrated in STA 114 including NIC 116. While the embodiment in FIG. 1 shows two STAs, other embodiments may include a different number of STAs.

AP 102 may communicate with STAs 110 and 114 via signals 122 and 120, respectively. AP 106 may communicate with STAs 110 and 114 via signals 126 and 124, respectively. Signals 120, 122, 124, and 126 may utilize one or more of a number of available channels. A channel in a communications medium may be defined in any number of ways, including a frequency band, a time period, a coding scheme (for example, in embodiments making use of spread spectrum techniques), a combination of spatial and other information, and the like, including multiple combinations of differentiating a communications medium. Channels are defined in various ways for particular communications protocols, and various embodiments may make use of various communications protocols. In various embodiments, at least one of signals 120, 122, 124, and 126 may comprise a beacon transmission. A beacon transmission may comprise a type of management frame, serving to identify the presence of the transmitting AP. In various other embodiments, signals 120, 122, 124, and 126 may comprise other types of transmissions.

A STA, such as STA 110 for example, may scan a plurality of channels simultaneously during a period of time. In various embodiments, STA 110 may perform such a scan to detect APs in its vicinity by detecting AP transmissions, such as, for example, signals 126 and 122. In various embodiments, some of such AP transmissions may comprise beacon transmissions. Signals 126 and 122 may arrive at different times at STA 110. Signals 126 and 122 may comprise signals transmitted in different channels. STA 110 may select for signal processing signal 126 as a first signal in a first channel in the plurality of channels in a first sub-period of time in the period of time. STA 110 may select for signal processing signal 122 as a second signal in a second channel in the plurality of channels in a second sub-period of time in the period of time. In various embodiments, STA 110 may perform such a scan using one receiver. In some embodiments, STA 110 may select one of the plurality of channels as an operational channel.

In various embodiments, AP 106 and AP 102 may be adapted to be synchronized to a common clock. In various other embodiments, AP 106 and AP 102 may not be adapted to be synchronized to a common clock.

Figure 2:
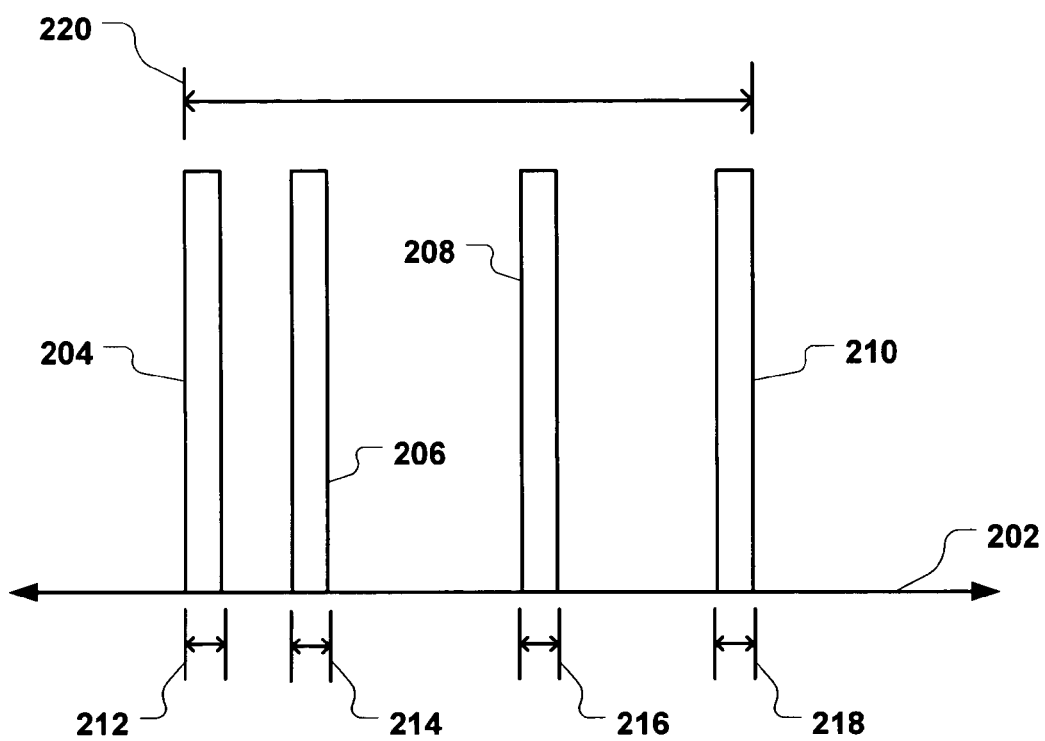
FIG. 2 is a block diagram illustrating a number of signals, in accordance with an embodiment of this invention.

FIG. 2 is a block diagram 200 illustrating a number of signals, in accordance with an embodiment of this invention. In various embodiments, signals 204, 206, 208, and 210 may be represented as occurring on time line 202 during period of time 220. Signal 204 may be transmitted/received in a first sub-period 212 during period of time 220. Signal 206 may be transmitted/received in a second sub-period 214 during period of time 220. Signal 208 may be transmitted/received in a third sub-period 216 during period of time 220. Signal 210 may be transmitted/received in a fourth sub-period 218 during period of time 220. In various embodiments, one sub-period of time may not temporally overlap with another sub-period of time. In various embodiments, a different number of signals may be transmitted/received. In some embodiments, at least one of signals 204, 206, 208, and 210 may represent a beacon transmitted by an AP. In various other embodiments, signals 204, 206, 208, and 210 may represent other identifying transmissions from other communications nodes. In various other embodiments, signals 204, 206, 208, and 210 may represent other types of transmissions from other communications nodes.

In various embodiments, a STA, such as STA 110 in FIG. 1 for example, may scan a plurality of channels simultaneously during a period of time. In various embodiments, signals 204, 206, 208, and 210 may represent signals being received in the plurality of channels being scanned by such a STA. In some embodiments, signals 204, 206, 208, and 210 may arrive at different times at STA 110. In some embodiments, signals 204, 206, 208, and 210 may arrive at overlapping times at STA 110. In various embodiments, signals 204, 206, 208, and 210 may comprise signals transmitted in different channels. In various embodiments, STA 110 may perform such a scan using one receiver.

Referring to STA 110, APs 102 and 106, and signals 126 and 122 in FIG. 1, two of signals 204, 206, 208, and 210 in FIG. 2 may correspond to signals 126 and 122, in some embodiments. In various other embodiments, signals 204 and 206 may correspond to other signals.

Figure 3:
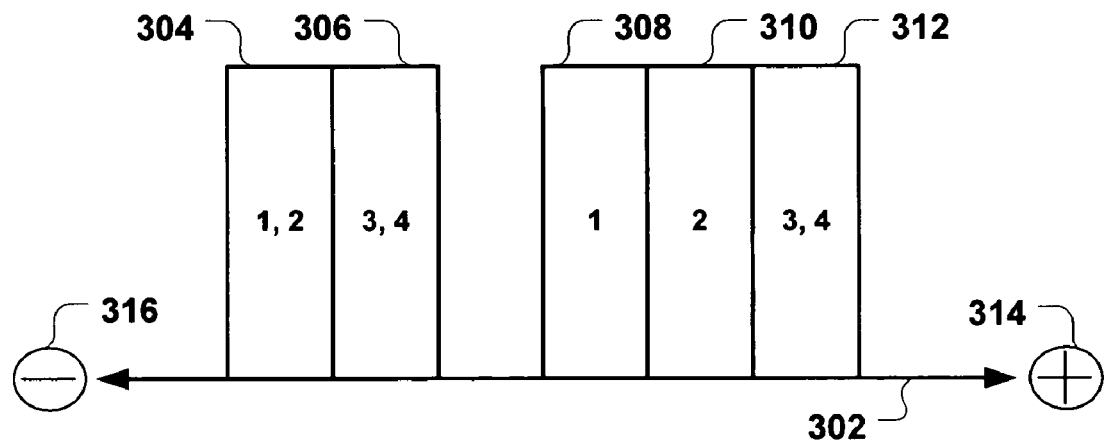
FIG. 3 is a block diagram illustrating some aspects of channel scanning, in accordance with an embodiment of this invention.

FIG. 3 is a block diagram 300 illustrating some aspects of channel scanning, in accordance with an embodiment of this invention. Block 304 may represent the simultaneous scanning of two channels, designated channel 1 and channel 2, for example. Block 306 may represent the simultaneous scanning of two channels, designated channel 3 and channel 4, for example. Block 308 may represent the scanning of channel 1 by itself. Block 310 may represent the scanning of channel 2 by itself. Block 312 may represent the simultaneous scanning of channels 3 and 4. Scanning of channels 1, 2, 3, and 4 may be represented as occurring on time line 302, with positive sign 314 and negative sign 316 representing the respective temporal directions on time line 302, as shown in FIG. 3.

A signal detected in one of the channels being scanned may persist for a time beyond a calculated or predefined period of time. In various embodiments, the amount of time a signal is detected in a particular channel may be estimated by measuring a power level in the particular channel. In various embodiments, the amount of time a signal is detected in a particular channel may be determined or measured in another manner. In various embodiments, the applicable calculated or predefined period of time may approximately comprise the duration of a beacon transmission. In various embodiments, the applicable calculated or predefined period of time may approximately comprise the duration of a beacon transmission and an additional duration of time. In various other embodiments, the applicable calculated or predefined period of time may approximately comprise the duration of another type of transmission. In various other embodiments, the applicable calculated or predefined period of time may comprise a duration period based on another factor or other factors, or based in conjunction with another factor or other factors.

In the example embodiment illustrated in FIG. 3, a signal in channel 1 may persist beyond a calculated or predefined period of time while channels 1 and 2 are being simultaneously scanned. In various embodiments, the first channel may be scanned by itself if the first signal in the first channel persists beyond a calculated or predefined period of time. In some embodiments, scanning the first channel by itself may be performed in a future scanning cycle. An illustration of such an embodiment may be represented as in FIG. 3, where blocks 304 and 306 may together represent a first scanning cycle, and blocks 308, 310, and 312 may together represent a second scanning cycle performed after the first scanning cycle. In various embodiments, the second channel may be scanned by itself if the second signal in the second channel persists beyond a calculated or predefined period of time. In some embodiments, scanning the second channel by itself may be performed in a future scanning cycle. An illustration of such an embodiment may be represented as in FIG. 3, where blocks 304 and 306 may together represent a first scanning cycle, and blocks 308, 310, and 312 may together represent a second scanning cycle performed after the first scanning cycle.

In various embodiments, once the first signal in the first channel persists beyond a calculated or predefined period of time, the first channel may be deselected. For example, in block 304, channels 1 and 2 may initially be scanned. If a signal in either channel persists beyond a calculated or predefined period of time, the channel in which the signal resides may be deselected for the duration of the rest of the scanning period, for example, for the rest of the duration of block 304 if such an event occurred before the end of the duration of block 304. A signal persisting beyond a calculated or predefined period of time may signify, in some embodiments, a possible active transmission on the applicable channel. In other embodiments, a signal persisting beyond a calculated or predefined period of time may signify another type of transmission.

In various embodiments where more than two channels are scanned simultaneously, operations similar to those illustrated for scanning a plurality of two channels simultaneously in FIG. 3 may occur. For example, in an embodiment where a plurality of channels greater than two are initially scanned simultaneously, a block analogous to block 304 may represent the plurality of channels being scanned simultaneously. In various embodiments, if a signal in a first channel persists beyond a calculated or predefined period of time, the first channel may be scanned separately in a future scanning cycle, with the remaining channels in the plurality of channels being scanned simultaneously following the individual scanning of the first channel. In various other embodiments, the remaining channels in the plurality of channels may also be scanned separately in the future scanning cycle. In various other embodiments, other operations may occur in accordance with one or more of the claims herein.

Figure 4:
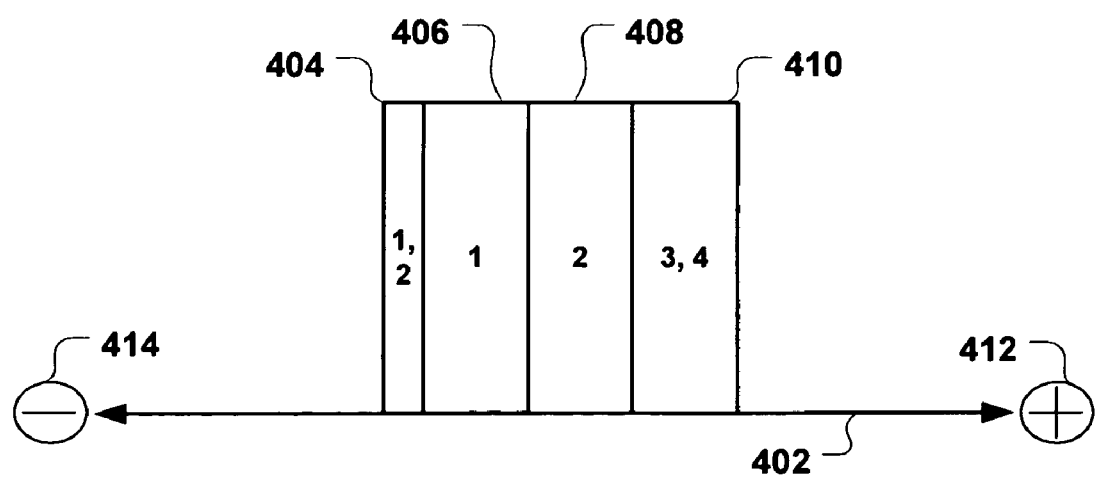
FIG. 4 is a block diagram illustrating some aspects of channel scanning, in accordance with an embodiment of this invention.

FIG. 4 is a block diagram 400 illustrating some aspects of channel scanning, in accordance with an embodiment of this invention. Block 404 may represent the simultaneous scanning of two channels, designated channel 1 and channel 2, for example. Block 406 may represent the scanning of channel 1 by itself. Block 408 may represent the scanning of channel 2 by itself. Block 410 may represent the simultaneous scanning of two channels, designated channel 3 and channel 4, for example. Scanning of channels 1, 2, 3, and 4 may be represented as occurring on time line 402, with positive sign 412 and negative sign 414 representing the respective temporal directions on timeline 402, as shown in FIG. 4.

A signal detected in one of the channels being scanned may persist for a time beyond a calculated or predefined period of time. In various embodiments, the amount of time a signal is detected in a particular channel may be estimated by measuring a power level in the particular channel. In various embodiments, the amount of time a signal is detected in a particular channel may be determined or measured in another manner. In various embodiments, the applicable calculated or predefined period of time may approximately comprise the duration of a beacon transmission. In various embodiments, the applicable calculated or predefined period of time may approximately comprise the duration of a beacon transmission and an additional duration of time. In various other embodiments, the applicable calculated or predefined period of time may approximately comprise the duration of another type of transmission. In various other embodiments, the applicable calculated or predefined period of time may comprise a duration period based on another factor or other factors, or based in conjunction with another factor or other factors.

In the example embodiment illustrated in FIG. 4, a signal in channel 1 may persist beyond a calculated or predefined period of time while channels 1 and 2 are being simultaneously scanned. The simultaneous scanning of channels 1 and 2 may be represented by block 404. In various embodiments, the first channel may be scanned by itself if the first signal in the first channel persists beyond a calculated or predefined period of time. In various embodiments, the scanning of the first channel by itself may occur immediately upon the first signal in the first channel persisting beyond the calculated or pre-determined period of time. An illustration of such an operation may be represented as in FIG. 4, where block 404 may represent an abbreviated scanning period of channels 1 and 2, and block 406 may represent scanning the first channel by itself immediately upon the first signal in the first channel persisting beyond a calculated or pre-determined period of time. Block 408 may represent scanning the second channel in the plurality of channels initially scanned. A signal persisting beyond a calculated or predefined period of time may signify, in some embodiments, a possible active transmission on the applicable channel. In other embodiments, a signal persisting beyond a calculated or predefined period of time may signify another type of transmission.

In various embodiments where more than two channels are scanned simultaneously, operations similar to those illustrated for scanning two channels simultaneously in FIG. 4 may occur. For example, in an embodiment where a plurality of channels greater than two is scanned simultaneously, a block analogous to block 404 may represent the plurality of channels being scanned simultaneously. In various embodiments, if a signal in a first channel persists beyond a calculated or predefined period of time, the first channel may immediately be scanned separately, with the remaining channels in the plurality of channels being scanned simultaneously following the individual scanning of the first channel. In various other embodiments, after the first channel is immediately scanned separately, the remaining channels in the plurality of channels may be scanned separately in a corresponding plurality of periods following the individual scanning of the first channel. In various other embodiments, other operations may occur in accordance with one or more of the claims herein.

Figure 5:
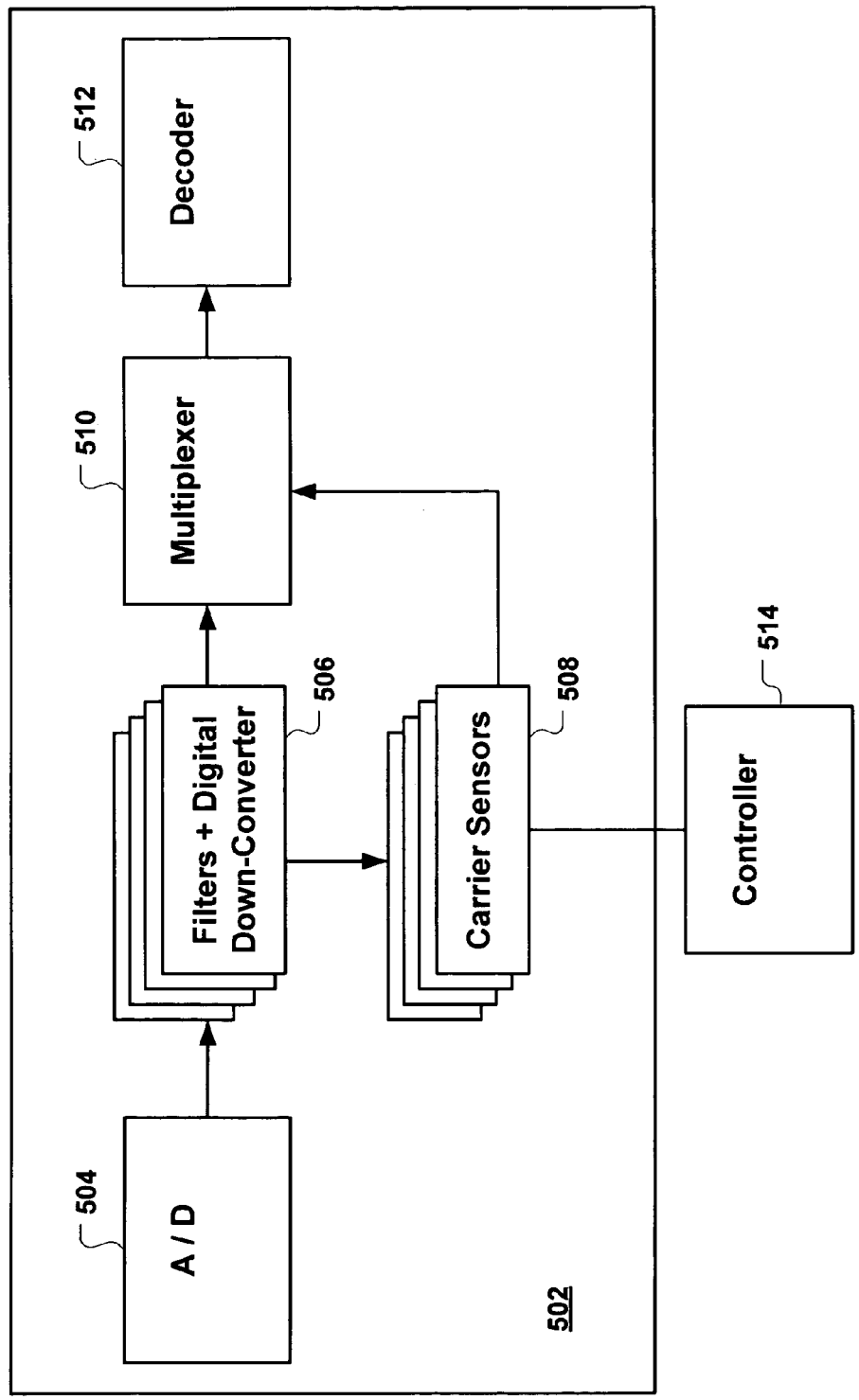
FIG. 5 is a block diagram illustrating some of the functional blocks of a communications apparatus, in accordance with an embodiment of this invention.

FIG. 5 is a block diagram illustrating some of the functional blocks of a communications apparatus 500, in accordance with an embodiment of this invention. In various embodiments, communications apparatus 500 may comprise receiver circuitry block 502 coupled to controller block 514. In various embodiments, receiver circuitry block 502 may comprise analog-to-digital converter (A/D) block 504, filters and digital down-converter block 506, multiplexer block 510, decoder block 512, and carrier sensors block 508.

In various embodiments, filters and digital down-converter block 506 may include a plurality of filters. In various embodiments, A/D block 504 may be coupled to filters and digital down-converter block 506, and may be adapted to receive a plurality of analog signals. In various embodiments, carrier sensors block 508 may include a plurality of carrier sensors. In various embodiments, the plurality of carrier sensors in carrier sensors block 508 may be correspondingly coupled to the plurality of filters in filters and digital down-converter block 506, with each of the plurality of carrier sensors adapted to detect a corresponding carrier signal in a plurality of carrier signals. In various embodiments, multiplexer 510 may be coupled to the plurality of filters in filters and digital down-converter block 506 and the plurality of carrier sensors in carrier sensors block 508. In various embodiments, multiplexer 510 may be adapted to select an output of one of the plurality of filters in filters and digital down-converter block 506 based at least in part upon an output of one of the plurality of carrier sensors in carrier sensors block 508. In various embodiments, controller block 514 may be coupled to the plurality of carrier sensors in carrier sensors block 508 to at least partially control their operation, including controlling a carrier sensor to temporarily stop sensing a carrier signal if the carrier signal has been received beyond a period of time. In various embodiments, controller block 514 may be provided with the period of time or adapted to calculate the period of time. In various embodiments, decoder 512 may be coupled to multiplexer 510, with decoder 512 adapted to decode a signal relayed by multiplexer 510.

In one embodiment described for illustrative purposes, receiver circuitry block 502 may be designed to simultaneously scan up to four adjacent 20 megahertz (MHz) channels. In such an embodiment, A/D block 504 may include an 80 MHz A/D, filters and digital down-converter block 506 may include four filters, multiplexer block 510 may include a four to one multiplexer, and carrier sensors block 508 may include four carrier sensors. In another embodiment, the same components described to simultaneously scan up to four adjacent 20 MHz channels may be used to scan a different number of channels, and the channels may comprise different bands of spectrum. For example, depending on the operational environment, two 30 MHz channels may be scanned, and in various other embodiments, a different number of channels with different band characteristics may be scanned. In various other embodiments, receiver circuitry block 502 may be designed to simultaneously scan up to four adjacent 20 MHz channels and may comprise a different configuration than described above.

In one embodiment described for illustrative purposes, receiver circuitry block 502 may be designed to simultaneously scan up to two adjacent 20 MHz channels. In such an embodiment, A/D block 504 may include a 40 megahertz A/D, filters and digital down-converter block 506 may include two filters, multiplexer block 510 may include a two to one multiplexer, and carrier sensors block 508 may include two carrier sensors. In another embodiment, the same components described to simultaneously scan up to two adjacent 20 MHz channels may be used to scan a different number of channels, and the channels may comprise different bands of spectrum. In various other embodiments, receiver circuitry block 502 may be designed to simultaneously scan up to two adjacent 20 MHz channels and may comprise a different configuration than described above.

In various other embodiments, receiver circuitry bock 502 may be adapted to receive a different number of channels with different band characteristics with differently specified components than specified in the illustrative embodiments. In various embodiments, nonadjacent channels may be scanned simultaneously. In one embodiment described for illustrative purposes, receiver circuitry block 502 may be adapted to scan two 20 MHz channels residing at opposite ends of an 80 MHz band of spectrum.

In various embodiments, communications apparatus 500 may comprise a client apparatus operating on a communications network. In various embodiments, such a network may be a wireless network. In various embodiments, communications apparatus 500 may comprise an 802.11 compliant or compatible station. In various embodiments, communications apparatus 500 may comprise a station additionally or alternatively compatible with other networking standards or protocols.

Figure 6:
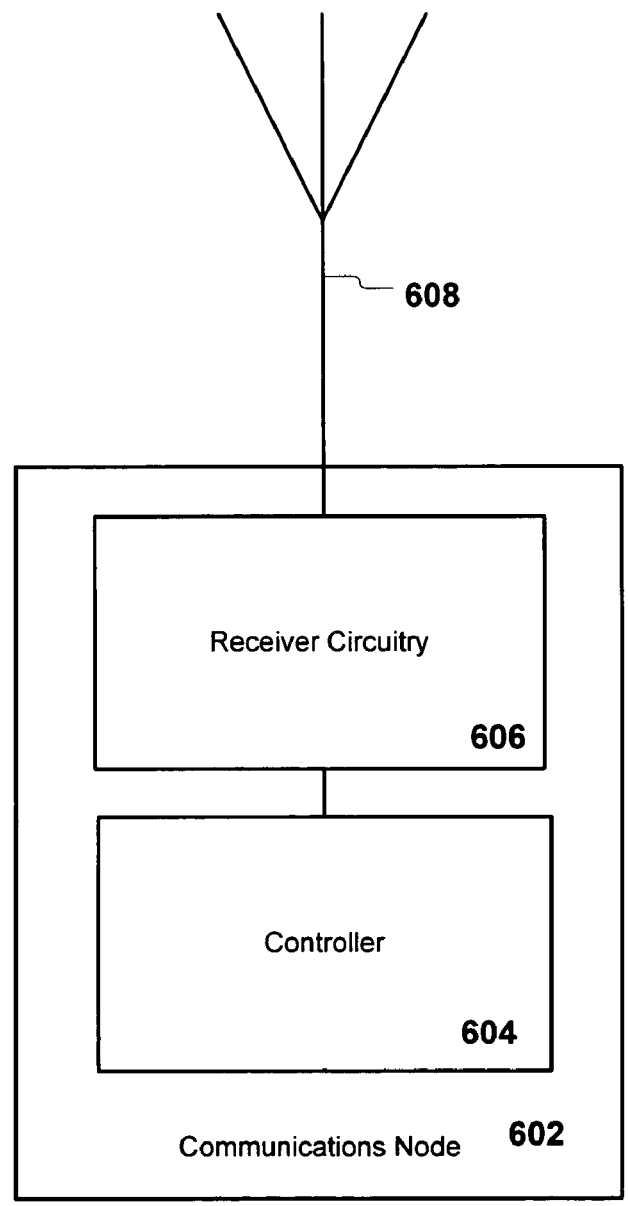
FIG. 6 illustrates some components of a communications system, in accordance with an embodiment of this invention.

FIG. 6 illustrates some components of a communications system 600, in accordance with an embodiment of this invention. In various embodiments, communications system 600 may include one or more substantially omnidirectional antenna(e) designed to at least facilitate reception of communication signals, represented by antenna 608. In some embodiments, communications system 600 may include one such antenna. In some other embodiments, communications system 600 may include two or more such antennae, for example to provide a spatial division multiple access (SDMA) system or a multiple input, multiple output (MIMO) system. In various embodiments, one or more of the one or more antennae may comprise a dipole antenna. In various other embodiments, a dipole antenna may not be used. In various embodiments, different types of antennae may be used, including different types of antennae coupled to the same communications system.

In various embodiments, communications system 600 may include communications node 602. In some embodiments, communications node 602 may be coupled to at least one of the one or more substantially omnidirectional antenna(e), represented by antenna 608. In various embodiments, communications node 602 may comprise receiver circuitry block 606 and controller block 604. In various embodiments, receiver circuitry block 606 may correspond to receiver circuitry block 502 in FIG. 5. In some embodiments, receiver circuitry block 606 may include the same functional internal blocks as receiver circuitry block 502 in FIG. 5. In various embodiments, controller block 604 may correspond to controller block 514 in FIG. 5.

Referring again to controller block 514 in FIG. 5, controller block 604 may correspondingly be coupled to a plurality of carrier sensors (not shown in FIG. 6) within receiver circuitry block 606 to at least partially control the operation of the plurality of carrier sensors, including controlling a carrier sensor to temporarily stop sensing a carrier signal if the carrier signal has been received beyond a period of time. In various embodiments, controller block 604 may be provided with the period of time or adapted to calculate the period of time.

In some embodiments, controller block 604 may be coupled to a controller readable medium (not shown) comprising a storage medium having a plurality of instructions stored therein designed to perform at least some of the operations described herein. In some embodiments, controller block 604 may include a controller readable medium (not shown) comprising a storage medium having a plurality of instructions stored therein designed to perform at least some of the operations described herein. In various embodiments, the storage medium may comprise of any type of storage medium, including electronic memory, magnetic memory, or any type of past, present, or future storage medium consistent with the principles of an embodiment of this invention.

In various embodiments, communications node 602 may comprise or be integrated in an 802.11 compliant or compatible station. In various embodiments, communications node 602 may comprise or be integrated in an 802.16 compliant or compatible station. Communications node 602 may be compatible with alternative standards. Communications node 602 may also be compatible with multiple standards. In various embodiments, communications node 602 may be integrated in any number of electronic devices to augment the electronic devices' abilities. Such electronic devices may include, for example, a cellular phone, a personal digital assistant (PDA), a handheld computer, a laptop computer, a personal computer, a set-top box, a handheld gaming device, a game console, a video display, a video camera, a digital versatile disk (DVD) player, a home entertainment console, or any such device that may make use of network access.

Thus, it can be seen from the above description, a method of operation in a communications node is described. The method of operation includes the communications node scanning a plurality of channels simultaneously during a period of time, with the communications node selecting for signal processing a first signal, in a first channel in the plurality of channels, in a first sub-period of time in the period of time. The method of operation includes the communications node selecting for signal processing a second signal, in a second channel in the plurality of channels, in a second sub-period of time in the period of time. Communications nodes and devices, subsystems, and systems equipped to operate in the above manner have also been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A method of operation in a communications node comprising:
    scanning, by the communications node, a first plurality of channels simultaneously to detect one or more beacon transmissions during a first period of time;
    selecting, by the communications node, a signal in a first channel of the first plurality of channels for signal processing;
    determining, by the communications node, that the signal in the first channel of the first plurality of channels persists beyond a duration of a beacon signal based at least in part on the signal processing;
    deselecting, by the communication node, the first channel of the first plurality of channels from simultaneous scanning for a remainder of the first period of time to prevent receipt of overlapping signals on the first plurality of channels;
    scanning, by the communication node, a second plurality of channels simultaneously to detect one or more beacon transmissions during a second period of time, wherein the first period of time is different than the second period of time; and
    detecting, by the communications node, a first beacon signal in a first channel of the second plurality of channels and a second beacon signal in a second channel of the second plurality of channels during the second period of time.

2. The method of claim 1, wherein said simultaneous scanning of the first plurality of channels and the second plurality of channels is performed by one receiver.

3. The method of claim 1, wherein the detecting of the first beacon signal and the second beacon signal comprises detecting a first beacon signal that does not temporally overlap in time with a second beacon signal.

4. The method of claim 1, further comprising scanning of the first channel of the first plurality of channels by itself.

5. The method of claim 4, wherein said scanning of the first channel of the first plurality of channels by itself occurs in a future scanning cycle.

6. The method of claim 4, wherein said scanning of the first channel of the first plurality of channels by itself occurs immediately upon the signal in the first channel of the first plurality of channels persisting beyond the calculated or predetermined period of time.

7. The method of claim 1, further comprising scanning, by the communications node, a second channel of the first plurality of channels by itself in response to the deselecting.

8. The method of claim 1, further comprising excluding by the communications node, the first channel of the first plurality of channels from future simultaneous scans of the first plurality of channels based at least in part on the determining.

9. The method of claim 1, further comprising selecting by the communications node, one of the first plurality of channels or the second plurality of channels as an operational channel.

10. The method of claim 1, wherein the communications node comprises a client operating on a wireless network.

11. The method of claim 1, wherein the first beacon signal is transmitted by a second communications node, the second beacon signal is transmitted by a third communications node, and the second and the third communications nodes are synchronized to a common clock.

12. A communications apparatus comprising:
    a plurality of filter blocks, wherein the plurality of filter blocks are configured to filter a plurality of carrier signals received over a plurality of independent channels, wherein the plurality of independent channels are scanned simultaneously;
    a plurality of carrier sensors correspondingly coupled to the plurality of filter blocks, each of the plurality of carrier sensors to detect a corresponding carrier signal in the plurality of carrier signals;
    a multiplexer coupled to the plurality of filter blocks and the plurality of carrier sensors, the multiplexer to select an output of one of the plurality of filter blocks based at least in part upon an output of one of the plurality of carrier sensors; and
    a controller coupled to the plurality of carrier sensors to at least partially control their operation, wherein the controller is configured to determine if a carrier signal persists beyond a duration of a beacon signal, and in response to the determination, deselect the carrier signal from a simultaneous scan for a remainder of the simultaneous scan to prevent receipt of overlapping carrier signals.

13. The communications apparatus of claim 12, wherein a filter block in the plurality of filter blocks comprises a filter and a digital down-converter.

14. The communications apparatus of claim 12, further comprising an analog-to-digital converter coupled to the plurality of filters, the analog-to-digital converter to receive a plurality of analog signals.

15. The communications apparatus of claim 12, further comprising a decoder coupled to the multiplexer, the decoder to decode a signal relayed by the multiplexer.

16. The communications apparatus of claim 12, wherein the communications apparatus comprises a client operating on a wireless network.

17. The communications apparatus of claim 12, wherein the communications apparatus comprises an 802.11 compliant or compatible station.

18. A communications system comprising:
one or more antenna(e), designed to at least facilitate reception of a plurality communication signals, wherein the plurality of communication signals are received from a plurality of communication channels that are scanned simultaneously; and
a communications apparatus, the communications apparatus coupled to at least one of the one or more antenna(e), and including
a plurality of filter blocks, wherein the plurality of filter blocks are configured to filter the plurality of communication signals received over the plurality of communication channels,
a plurality of carrier sensors correspondingly coupled to the plurality of filter blocks, each of the plurality of carrier sensors to detect a corresponding communication signal in a plurality of communication signals,
a multiplexer coupled to the plurality of filter blocks and the plurality of carrier sensors, the multiplexer to select an output of one of the plurality of filter blocks based at least in part upon an output of one of the plurality of carrier sensors, and
a controller coupled to the plurality of carrier sensors to at least partially control their operation, wherein the controller is configured to determine if a communication signal persists beyond a duration of a beacon signal, and in response to the determination, deselect the carrier signal from a simultaneous scan for a remainder of the simultaneous scan to prevent receipt of overlapping carrier signals.

19. The communications system of claim 18, wherein the communications apparatus comprises an 802.11 compliant or compatible station.

20. The communications system of claim 18, wherein the communications apparatus comprises a selected one from the group consisting of a cellular phone, a video camera, a personal digital assistant, and a handheld gaming device.

21. A non-transitory computer readable medium comprising:
a storage medium; and
a plurality of instructions stored in the storage medium, the instructions designed to enable an apparatus to:
scan a plurality of channels simultaneously during a period of time to detect one or more beacon transmissions;
select a signal in a first channel of the plurality of channels for signal processing;
determine that the first signal in the first channel of the plurality of channels persists beyond a duration of a beacon signal based at least in part on the signal processing; and
deselecting the first channel of the plurality of channels from simultaneous scanning for a remainder of the period of time based at least in part on the determination to prevent receipt of overlapping signals on the plurality of channels.

22. The computer readable medium of claim 21, wherein the instructions are further designed to scan the channel of the plurality of channels independent of the plurality of channels based at least in part on the determination.

23. The computer readable medium of claim 21, wherein the instructions are further designed to select one of the plurality of channels as an operational channel.

* * * * *